US010005955B2

(12) United States Patent
Beuterbaugh et al.

(10) Patent No.: US 10,005,955 B2
(45) Date of Patent: Jun. 26, 2018

(54) FOAMED CHELATING AGENT TREATMENT FLUIDS FOR USE IN SUBTERRANEAN MATRIX STIMULATIONS AND SUBTERRANEAN AND SURFACE CLEANOUT OPERATIONS

(71) Applicant: Halliburton Energy Services, Inc., Houston, TX (US)

(72) Inventors: Aaron Michael Beuterbaugh, Spring, TX (US); Wirdansyah Lubis, Magnolia, TX (US); Alyssa Lynn Smith, Humble, TX (US); Enrique Antonio Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 661 days.

(21) Appl. No.: 14/362,932

(22) PCT Filed: Jul. 24, 2013

(86) PCT No.: PCT/US2013/051759
§ 371 (c)(1),
(2) Date: Jun. 5, 2014

(87) PCT Pub. No.: WO2015/012818
PCT Pub. Date: Jan. 29, 2015

(65) Prior Publication Data
US 2015/0232744 A1     Aug. 20, 2015

(51) Int. Cl.
*C09K 8/94*     (2006.01)
*E21B 43/25*    (2006.01)
(52) U.S. Cl.
CPC ............... *C09K 8/94* (2013.01); *E21B 43/25* (2013.01)

(58) Field of Classification Search
CPC .................................. C09K 8/94; E21B 43/25
USPC ........................................................ 166/311
See application file for complete search history.

(56) References Cited

U.S. PATENT DOCUMENTS

| 5,705,476 A | 1/1998 | Hoffarth |
| 2003/0104950 A1 | 6/2003 | Frenier et al. |
| 2010/0311998 A1 | 12/2010 | De Wolf et al. |
| 2011/0131873 A1* | 6/2011 | Soane ........................ C02F 1/40 44/608 |

(Continued)

FOREIGN PATENT DOCUMENTS

WO     2015012818 A1     1/2015

OTHER PUBLICATIONS

Holcomb, David L., "Foamed Acid as a Means for Providing Extended Retardation," SPE 6376, 1977.

(Continued)

*Primary Examiner* — Angela M DiTrani
*Assistant Examiner* — Ashish K Varma
(74) *Attorney, Agent, or Firm* — McDermott Will & Emery LLP

(57) ABSTRACT

Treatment fluids and methods include a method that includes the steps of providing or preparing a foamed chelating agent treatment fluid that includes: an aminopolycarboxylic acid chelating agent, an aqueous base fluid, a gas, and a foaming agent, and lacing the foamed chelating agent treatment fluid in a subterranean formation penetrated by a well bore. The aminopolycarboxylic acid chelating agent foamed fluids may also be used in equipment clean-out operations.

19 Claims, 1 Drawing Sheet

(56) References Cited

U.S. PATENT DOCUMENTS

| | | | | |
|---|---|---|---|---|
| 2011/0237470 A1* | 9/2011 | Li | ............ | C09K 8/584 |
| | | | | 507/238 |
| 2012/0097392 A1* | 4/2012 | Reyes | ............ | C02F 5/12 |
| | | | | 166/279 |
| 2013/0269941 A1* | 10/2013 | Reyes | ............ | E21B 43/16 |
| | | | | 166/300 |

OTHER PUBLICATIONS

Scherubel et al., "Foamed Acid, a New Concept in Fracture Acidizing," SPE 7568, 1978.
Ford, William, "Foamed Acid—An Effective Stimulation Fluid," SPE 9385, 1981.
International Search Report and Written Opinion for PCT/US2013/051759 dated Apr. 23, 2014.
Schmidt et al., Occurrence of Aminopolycarboxylates in the Aquatic Environment of Germany, Environmental Pollution, 2004, vol. 131, Issue 1, pp. 107-124.
Griffith et al., Novel Platinum(11) Amine Hydroxamate and Hydroximate Complexes and the Platinum-Assisted Hydrolysis of Hydroxamic Acids, Dalton Transactions, 2005, vol. 7, No. 5, pp. 956-961.

* cited by examiner

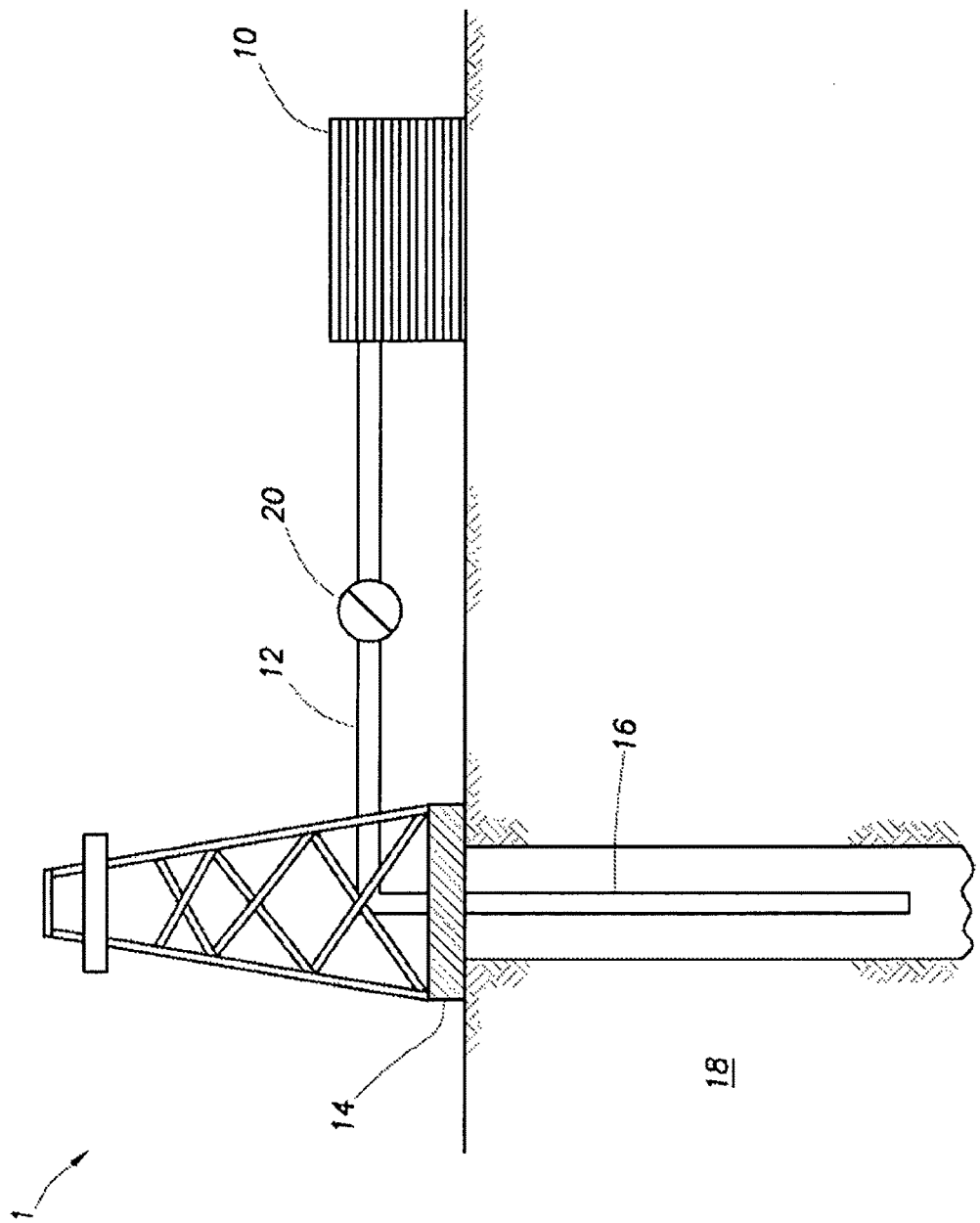

FOAMED CHELATING AGENT TREATMENT FLUIDS FOR USE IN SUBTERRANEAN MATRIX STIMULATIONS AND SUBTERRANEAN AND SURFACE CLEANOUT OPERATIONS

BACKGROUND

This disclosure relates to foamed acid technologies, and more specifically, to foamed chelating agent treatment fluids for production enhancement treatments, such as matrix stimulation, in subterranean well bores and for the efficient dissolution of scale and fouling of associated equipment.

In many instances, it is desirable to stimulate hydrocarbon-producing intervals in subterranean formations to improve productivity or remove damage. Several means are available to accomplish the desired stimulation. In carbonate formations such as limestone and dolomite, hydrochloric acid and certain organic acids (e.g., formic acid and acetic acid) may be injected, often under pressure, to etch channels, dissolve formation materials in pore spaces, and improve well productivity. Another production stimulation treatment known as fracture-acidizing involves the formation of one or more fractures in the formation and the introduction of an aqueous acidizing fluid into the fractures to etch the fracture faces, whereby flow channels are formed when the fractures close. The aqueous acidizing fluid also enlarges the pore spaces in the fracture faces and in the formation, thereby increasing the permeability of the formation. "Acidizing" as used herein refers to both fracture acidizing and matrix acidizing.

In carrying out acidizing treatments in certain subterranean zones, the acidizing fluid used can be lightweight to prevent excessive hydrostatic pressure from being exerted on the subterranean zone, e.g., when such zone is prone to fracturing. As a result, a variety of lightweight acidizing fluids have heretofore been developed and used, including foamed acidizing fluids. In addition to being lightweight, a foamed acidizing fluid contains compressed gas which improves the ability of the acidizing fluid to backflow out of a subterranean zone that has been acidized and undergo subsequent recovery. Another benefit is the diverting effect that foamed acidizing fluids have over nonfoamed acidizing fluids.

Foamed acidizing fluids have heretofore involved the use of hydrochloric acid. Hydrochloric acid is a strong acid that presents safety concerns at the wellsite and presents corrosion and toxicity limitations. Additionally, such acidizing fluids may not meet complete environmental regulations when, due to temperatures in excess of 200° F., specific additives like corrosion inhibitors have to be used in regulated areas. In other instances, the use of hydrochloric acid may be precluded by the metallurgical composition of the specific alloys making up the infrastructure of an operation. For instance, some transport pipelines are not made of the same steel alloy that is used in subterranean installations dedicated to extracting underground energetic resources. Other metallurgical alloys are also present in various industrial operations, like those dedicated to the transport of steam from geothermal extractive processes. Such alloys include, for instance, copper-alloys. These alloys cannot be judiciously exposed to hydrochloric acid-containing fluids.

Additionally, it may be desirable to improve the productivity of or remove damage from equipment that is often associated with subterranean well bores. Such equipment includes, for example, piping, heat exchangers, and associated turbines. Examples of such piping includes existing pipeline installations, such as those that carry produced hydrocarbon-containing fluids from a well site to a refinery, or energetic fluids like steam produced from a geothermal reservoir to an electricity generating station. Completion installations such as inflow control valves for instance are other examples. Removing the scale from the interior of a pipeline may be very difficult. Scaling deposits, which may include copper, silica, barium, iron and calcium scales, for example, can reduce the functionality of such equipment and decrease the flow rate through the equipment. In heat exchangers specifically, such scale deposits may lead to unbalanced, less efficient heat exchange.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system that can deliver foamed chelating agent treatment fluids disclosed herein to a downhole location, according to one or more embodiments.

DETAILED DESCRIPTION

This disclosure relates to foamed acid technologies, and more specifically, to foamed chelating agent treatment fluids for production enhancement treatments in subterranean well bores and for the efficient dissolution of scales and fouling of associated equipment. The features and advantages of the present invention will be readily apparent to those skilled in the art upon a reading of the description of the preferred embodiments that follows.

Of the many advantages presented herein associated with the foamed chelating agent treatment fluids, one is that the foamed chelating agent treatment fluids have fewer corrosive characteristics so that a myriad of metallurgies can be acid treated, or descaled, at temperatures not accessible with traditional acids such as HCl, $H_3PO_4$, and $H_2SO_4$. Additionally, the foamed chelating agent treatment fluids of this disclosure are capable of stabilizing metal cations over a broad pH range, even at high temperatures (e.g., <380° F. and a broad pH range of about 1 to about 9). Use of the chelating agent in the foamed chelating agent treatment fluids facilitates the presence of an acidic fluid that is able to complex with ions such as $Ca^{2+}$, $Fe^{3+}$, $Fe^{2+}$, $Cu^{2+}$, and $Ni^{2+}$, without precipitation (e.g., citric acid with $Ca^{2+}$). This characteristic keeps these ions in solution thereby avoiding redeposition. Due to this characteristic as well as its lightweight/foamed nature, these foamed chelating agent treatment fluids of the present disclosure may be used to achieve deeper radial penetration into a formation matrix even at elevated temperatures (e.g., bottom hole temperature of about 125° F. or higher), especially as compared to conventional acid treatments, which are often spent in the near well bore region due to the high reactivity of the acid. Further, the foamed chelating agent treatment fluids have slower reaction kinetics, which also enhances their ability to achieve deeper radial penetration, even at temperatures of about 125° F. or higher.

For scale removal applications, the foamed chelating agent treatment fluids presented herein are particularly useful in removing inorganic scale, which may include magnesium chloride, calcium carbonate, iron carbonate, calcium sulfate, iron oxides, and other metal scales to name a few. Moreover, the foamed chelating agent treatment fluids are considered environmentally friendly under current standards because they are biodegradable and not a marine pollutant.

As an additional advantage, the foamed chelating agent treatment fluids presented herein may be used to remove scale from equipment such as pipes, tubulars, heat exchangers, and the like that are not easily cleaned using conventional methods. The equipment may be related to a well at a wellsite that is drilling for hydrocarbons, water, or other energetic or valuable fluids. The equipment also may be related to a geothermal well or a mining operation. The equipment also may relate to pipelines or refining equipment as well. The foamed chelating agent treatment fluids presented herein may function better than more traditional acidizing fluids in such applications because they are able to sequester and stabilize the dissolution products of the scale in solution even over a broad pH range (e.g., pH of 1 to about 9).

One or more illustrative embodiments incorporating the foamed chelating agent treatment fluids disclosed herein are presented below. It is understood that in the development of a working embodiment incorporating the foamed chelating agent treatment fluids, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill in the art having the benefit of this disclosure.

The foamed chelating agent treatment fluids of the present invention may comprise an aminopolycarboxylic acid chelating agent, an aqueous base fluid, a gas, a foaming agent, and optionally, additional additives.

A number of aminopolycarboxylic acids may be suitable for use as the chelating agent in the treatment fluids and methods described herein. In some preferred embodiments, the aminopolycarboxylic acid chelating agents may be biodegradable. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. In this regard, suitable aminopolycarboxylic acid chelating agents may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxyl)ethyl]glycine (BCA6), N-bis[2-(1,2-dicarboxyethoxyl)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof. Particularly suitable biodegradable chelating agents that may be used in the treatment fluids and methods described herein include, for example, MGDA, GLDA, EDDS, β-ADA, IDS, TCA6, BCA3, BCA5, BCA6, MCBA3, and MCBA5. In some embodiments, a combination of MDGA and GLDA may be suitable. A particularly preferred biodegradable chelating agent for use as described herein is MGDA.

In some embodiments, as an alternative to or in addition to the aminopolycarboxylic acid chelating agents, traditional chelating agents such as, for example, ethylenediaminetetraacetic acid (EDTA), ethylenediaminedi(o-hydroxyphenylacetic) acid (EDDHA), glucoheptonic acid, gluconic acid, citric acid, any salt thereof, any derivative thereof, or any combination thereof may be included in the treatment fluids described herein.

In some or other alternative embodiments, as an alternative to or in addition to the aminopolycarboxylic acid chelating agents, suitable chelating agents may include hydroxamates, having the general formula R—CO—NH—OH. In some or other alternative embodiments, as an alternative to or in addition to the aminopolycarboxylic acid chelating agents, suitable chelating agents may include pyridinecarboxylic acids. In still other embodiments, the treatment fluid may include one or more aminopolycarboxylic acid chelating agents, one or more hydroxamates, and one or more pyridinecarboxylic acids.

In some embodiments, the chelating agent may comprise the neutral form of the chelating agent (i.e., carboxylic acid groups fully protonated). In other embodiments, the chelating agent may comprise a salt form of the chelating agent, including an alkali metal salt of the chelating agent. Other salt forms of the chelating agent may also be used and include, for example, an ammonium salt form or a quaternary ammonium salt form, if available. In some embodiments, the chelating agent may be used in a concentrate form wherein the concentrate also comprises water. An example of a suitable concentrate is a 40% by weight MGDA concentrate that comprises water and MGDA.

In various embodiments, the concentration of the chelating agent in the treatment fluid may range between about 0.1% to about 40% of the treatment fluid by weight. In some embodiments, the chelating agent may be included in the treatment fluid in an amount ranging from a lower limit of about 0.1% by weight, 0.25% by weight, 0.5% by weight, 1% by weight, 5% by weight, or 10% by weight to an upper limit of about 40% by weight, 35% by weight, 30% by weight, 25% by weight, 20% by weight, 15% by weight, or 10% by weight of the treatment fluid, and wherein the concentration may range from any lower limit to any upper limit and encompasses any subset therebetween. A preferred concentration range for the chelating agent is about 12% to about 13% by weight of the treatment fluid, and in some embodiments, about 12.5% by weight of the treatment fluid. If the chelating agent is delivered or available or provided in a concentrate form, one of ordinary skill in the art will be able to adjust these percentages accurately to formulate a treatment fluid as described herein based on the molarity of the concentrate and the desired molarity in the treatment fluid.

The aqueous base fluid in the foamed chelating agent treatment fluids may include any suitable aqueous carrier fluids such as, for example, fresh water, acidified water, salt water, seawater, brine (e.g., a saturated salt solution), or an aqueous salt solution (e.g., a non-saturated salt solution). One should note that using a salt solution like a brine or seawater may lower the overall concentration of the chelating agent in the treatment fluid. Such aqueous base fluids may be obtained from any suitable source. Mutual solvents such as glycols or glycol ethers may be included in the aqueous base fluid if desired. Preferably, the aqueous base fluid has a minimum amount of solids content. Given the benefit of the present disclosure, one of ordinary skill in the art will be able to determine a suitable aqueous base fluid for usation in the embodiments described herein. The term "base fluid" as used herein does not imply any particular pH of the base fluid.

The amount of the aqueous base fluid to include in an exemplary treatment fluid will be job dependent based on the concentration of the chelating agent needed to accomplish the designated purpose. For example, it is likely that an equipment clean-out operation will use a lesser concentration than a subterranean formation acidizing or fracture acidizing operation. If the concentration needed is less, then the amount of the aqueous base fluid to include in the treatment fluid is consequently more. The amount of foaming agent may also influence the amount of aqueous base fluid to include. In some embodiments, the aqueous base fluid may be included in the treatment fluid in an amount ranging from a lower limit of about 0.1% by weight, 2% by weight, 5% by weight, 10% by weight, 15% by weight, or 20% by weight to an upper limit of about 95% by weight, 90% by weight, 85% by weight, 80% by weight, 75% by weight, 65% by weight, 60% by weight, 55% by weight, 50% by weight, 45% by weight, 40% by weight, 35% by weight, 30% by weight, 25% by weight in the treatment fluid, and wherein the concentration may range from any lower limit to any upper limit and encompasses any subset therebetween. An exemplary upper limit for the amount of aqueous base fluid to include in a treatment fluid is about 75% by weight. In some highly concentrated embodiments, the minimum amount of aqueous base fluid needed is close to or about 0% by weight.

The gas used to foam the treatment fluids provided herein can be air, nitrogen, carbon dioxide, or other inert gas, such as argon or helium and the like, with nitrogen or carbon dioxide being preferred. The gas may be present in an amount sufficient to foam the chelating agent and form a desirable foamed chelating agent treatment fluid. In some embodiments, the gas may be included in the treatment fluid in an amount ranging from a lower limit of about 1% by volume of the treatment fluid, 2% by volume of the treatment fluid, 5% by volume of the treatment fluid, 10% by volume of the treatment fluid, 15% by volume of the treatment fluid, or 20% by volume of the treatment fluid, to an upper limit of about 80% by volume of the treatment fluid, 75% by volume of the treatment fluid, 65% by volume of the treatment fluid, 60% by volume of the treatment fluid, 55% by volume of the treatment fluid, 50% by volume of the treatment fluid, 45% by volume of the treatment fluid, 40% by volume of the treatment fluid, 35% by volume of the treatment fluid, 30% by volume of the treatment fluid, 25% by volume of the treatment fluid, and wherein the concentration may range from any lower limit to any upper limit and encompasses any subset therebetween. The gas may be generated in the treatment fluid by injecting a gas into the treatment fluid using suitable equipment known to those skilled in the art. Preferably, the resulting foam's quality ranges from about 50% to about 99%. The term "foam quality" as used herein means the percentage ratio of the volume of gas to the volume of gas and liquids present under the conditions existing in the subterranean formation.

A foaming agent or foam stabilizer can also be included in the foamed chelating agent treatment fluids described herein to facilitate the dispersion of the gas in the fluid and to enhance the stability of the resulting foamed composition. Suitable foaming agents are not to be particularly limited and can comprise anionic, cationic, nonionic, amphoteric materials or mixtures thereof. Representative foaming agents can include, for example, the general classes of these materials including alkoxylated alcohols, alkoxylated sulfated alcohols, alkyl sulfonates, aryl sulfonates, quaternary amine derivatives, alkyl amines reacted with sodium chloroacetate, alkali metal salts of fatty acids, and the like. Commercially available examples of suitable foaming agents include "HC-2" and "PEN-5M" available from Halliburton Energy Services, Inc. in multiple locations. In general, the foaming agent can be admixed with the treatment fluid in an amount of from about 0.1% to about 10% by volume of the treatment fluid. For moderate temperature applications, a preferred amount of the foaming agent to include in a treatment fluid is about 0.1% to about 0.5% by volume of the treatment fluid. For elevated temperature applications (~170° F. to 250° F.), a foaming agent concentration of about 1% to about 2.5% by volume of the treatment fluid may be preferred.

An example of an embodiment of a foamed chelating agent treatment fluid of the present disclosure comprises about 12.5% MGDA, about 85.5% to about 87% water, enough nitrogen gas to achieve a foam quality of about 70, and about 0.5% to about 2% of an amphoteric surfactant foaming agent. A corrosion inhibitor may be included if desired.

Optional additives may be included in the foamed chelating agent treatment fluids presented herein. If desired, foamed chelating agent treatment fluid treatment fluids formed in accordance with this disclosure can include gelling agents for additional stability, additional foam generating components, proppant material, and the like. For example, proppant material can be used to keep the fractures open once they are formed.

Suitable gelling agents include hydroxyethyl cellulose (HEC), carboxymethyl hydroxyethyl cellulose (CMHEC), carboxymethyl hydroxy propylguar (CMHPG), hydroxy propylguar (HPG), guar, xanthan, crosslinkable HEC and acrylamide polymers. The gelling agent or agents are preferably used in an amount of about 0.1% to about 1.3% by weight of the treatment fluid.

Examples of proppant material that may be employed include sand, graded gravel, glass beads, sintered bauxite, resin-coated sand, ceramic proppant and so forth. The amount of proppant material employed depends on the type of formation and fracture half-length that is desired. Generally, the proppant material is employed in an amount of about 0.25 pound to about 28 pounds per gallon of the base fracturing fluid used.

Various additives such as emulsion preventers, biocides, crosslinkers, gel breakers, pH adjusters, clay stabilizers, methanol, paraffin inhibitors, iron control additives, fluid loss additives, friction reducers, anti-sludging additives, corrosion inhibitors and other additives known to those skilled in the art can be effectively employed with the treatment fluids disclosed herein. Of course, the specific additive or additives employed will depend on the nature of the treatment, the exact nature of the composition, the type of formation and so forth.

Any suitable method for foaming the treatment fluid may be used. As an example, to make a foamed chelating agent treatment fluid as described herein for use in a subterranean formation application, the fluid and gas may be co-mingled in a suitable tank, e.g., a mixing tank located at a wellsite. The chelating agent and the aqueous base fluid (and optionally any other additives) may be supplied to the tank via one feed line and the foaming gas may be supplied via a second feed line. The resulting foamed chelating agent treatment fluid may be pumped downhole on-the-fly. In some embodiments, the foam may form in the fluid on-the-fly. In some embodiments, the two feed lines may be connected with a "T" connection forming a single feed line to the wellhead. The pressure at which the fluid may be injected into the subterranean formation will depend on the operation and the fracture gradient of the formation, as recognized by one skilled in the art. These factors will also influence the foam quality needed in the fluid to perform the operation. The desired foam quality can be back calculated according to Formula 1 below.

$$\text{Foam Quality} = \frac{\text{Actual Volume Gas}}{\text{Actual Volume of the Mixture}} \qquad \text{Formula 1}$$

Coiled tubing, tubing, or drill pipe may be used as needed to place the foamed chelating agent treatment fluid into the desired location/portion of the subterranean formation.

In alternative embodiments, the chelating treatment fluid may be prepared at a remote location relative to the wellsite and transported to the wellsite to be foamed on-the-fly and introduced into the subterranean formation as described herein.

The temperature stability of the foamed chelating agent treatment fluid may be a consideration in designing the fluid and designing the parameters under which the fluid will be used for a given operation. For instance, the temperature stability of a foamed chelating agent treatment fluid to be used in a subterranean application is much more important than for an equipment clean-out operation that is performed at the surface. For example, a foamed chelating treatment fluid of this disclosure having a 0.6 Molar concentration at a pH of 2 may be stable for up to 8 hours at 250° F. with 400 psi of differential pressure.

The methods of this invention for acidizing a subterranean formation penetrated by a well bore often comprise the following steps. A foamed chelating agent treatment fluid is provided or prepared that comprises an aminopolycarboxylic acid chelating agent, an aqueous base fluid, a gas, a foaming agent, and optionally, additional additives. Thereafter, at least a portion of the subterranean formation is contacted with the foamed chelating agent treatment fluid. In some embodiments, the fluid etches the surfaces of fractures present in the formation so as to improve the conductive pathways for hydrocarbons to flow for production. In some embodiments, the treatment fluid may be injected at a sufficient pressure so as to create or enhance at least one fracture in the formation and then the chelating agent may act to chelate the minerals of the fracture faces so as to improve the conductive pathway of the fracture. In some embodiments, high pressure delivery equipment may be used to inject the treatment fluid downhole. In some embodiments, the subterranean formation may have a bottom hole temperature of about 125° F. or more. In some embodiments, the chelating agent in the foamed chelating agent treatment fluid is able to react with the minerals in the formation so as to achieve deeper radial penetration from the well bore into the formation matrix than may be achieved using a conventional matrix acidizing fluid. In some embodiments, the foamed chelating agent treatment fluid removes or reduces scale or damage within the well bore or the subterranean formation left by previous treatments.

Another method of acidizing a portion of a subterranean formation penetrated by a well bore comprises the step: (a) providing a foamed chelating agent treatment fluid that comprises an aminopolycarboxylic acid chelating agent, an aqueous base fluid, a gas, a foaming agent, and optionally, additional additives; and (b) contacting the portion of the subterranean formation with the foamed chelating agent treatment fluid.

In some embodiments, the fluid etches the surfaces of fractures present in the formation so as to improve the conductive pathways for hydrocarbons to flow for production.

In some embodiments, the foamed chelating fluid removes or reduces scale or damage within the well bore or the subterranean formation left by previous treatments.

In some embodiments, the treatment fluid may be injected at a sufficient pressure so as to create or enhance at least one fracture in the formation and then the chelating agent may act to chelate the minerals of the fracture faces so as to improve the conductive pathway of the fracture.

In some embodiments, the subterranean formation may have a bottom hole temperature of about 250° F. or more.

When the foamed chelating agent treatment fluids disclosed herein are used for equipment clean-out operations, the operator needs to decide whether an open or closed circulation of the fluid in the equipment is most suitable for the operation. The scale of the equipment is a large factor that will determine whether open or closed circulation is most suitable. If circulation is open, oftentimes a larger volume of fluid will be needed to get the desired level of clean-out. Additionally, the concentration of the components in the fluid will need to be such that the chelating agent can be reactive with the scale in a short time period in which they interact in the open circulation. Open circulation may be most appropriate when the pipelines are relatively short and the scales therein are relatively thin. If the circulation is closed, the fluid may be circulated for up to 10 hours or more in the equipment. Closed circulation may be most appropriate when dealing with very long pipelines and/or when scales are very thick, and require a longer contact time.

An example of an equipment clean-out operation involves a pipeline that connects a wellsite to a refinery. In such an operation, an open circulation process is likely to be most successful. The foamed chelating agent treatment fluid is provided or prepared that comprises an aminopolycarboxylic acid chelating agent, an aqueous base fluid, a gas, a foaming agent, and optionally, additional additives, and is placed in the pipeline. Since the circulation is open, the fluid is a "one pass" over the scale in the pipeline. The opposite end of the pipeline from the end where the fluid was placed will emit the waste stream, which can be recovered. If the chelating agent is not spent, the fluid may be recirculated or reused in another operation. In some embodiments, for example for the pipeline covering a long distance, the pipeline may be divided into sections and each section may be treated as discussed. The length of each section may be determined by the effective flow loop and the horsepower available for placing the fluid in the pipeline, e.g., at maximum rates.

Another example of an equipment clean-out operation involves a heat exchanger. For such an operation, closed circulation of the foamed chelating agent treatment fluid is likely preferred.

Another example of an equipment clean-out operation involves a turbine. For such an operation, closed or open circulation of the foamed chelating agent treatment fluid may be used depending on preference. Closed circulation is likely preferred.

While compositions and methods are described in terms of "comprising" various components or steps, the compositions and methods can also "consist essentially of" or "consist of" the various components and steps. When "comprising" is used in a claim, it is open-ended.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claim, each numerical parameter should at least be construed in light of the number of reported significant digits and by applying ordinary rounding techniques.

Embodiments disclosed herein include a foamed chelating agent treatment fluid comprising: an aminopolycarboxylic acid chelating agent, an aqueous base fluid, a gas, and a foaming agent, and optionally, additional additives. All of the options for each of these components, i.e., the aminopolycarboxylic acid chelating agent, the aqueous base fluid, the gas, the foaming agent, and the optional additional additives, that are discussed herein may be used in any combination to form a treatment fluid of this disclosure, and through this sentence, every combination is hereby disclosed. By way of non-limiting example, exemplary combinations applicable to the treatment fluids include: any aminopolycarboxylic acid chelating agent (such as GLDA, MDGA, or any combination thereof); any aqueous base fluid (such as fresh water); any gas (such as air, nitrogen, or any combination thereof); and any optional additive such as proppant, a gelling agent, a biocide, etc. may be used to form a treatment fluid as described herein.

In various embodiments, systems configured for delivering the foamed chelating agent treatment fluids described herein to a downhole location are described. In various embodiments, the systems can comprise a pump fluidly coupled to a tubular, the tubular containing foamed chelating agent treatment fluids of the present disclosure that comprise an aminopolycarboxylic acid chelating agent, an aqueous base fluid, a gas, a foaming agent, and optionally, additional additives. In some instances, the tubular may include a coiled tubing.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying the foamed chelating agent treatment fluid fluids and possibly particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the foamed chelating agent treatment fluids may be formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated off-site and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver foamed chelating agent treatment fluids disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a foamed chelating agent treatment fluid may be formulated. The foamed chelating agent treatment fluid may be conveyed via line 12 to wellhead 14, where the treatment fluid enters tubular 16, tubular 16 extending from wellhead 14 into subterranean formation 18. Upon being ejected from tubular 16, the foamed chelating agent treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the foamed chelating agent treatment fluids may, in some embodiments, flow back to wellhead 14 and exit subterranean formation 18. In some embodiments, the foamed chelating agent treatment fluid that has flowed back to wellhead 14 may subsequently be recovered and recirculated to subterranean formation 18. In some embodiments, the foamed chelating agent treatment fluid fluids may be recycled if the chelating agent has not been fully spent.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1. Due to the reduce corrosivity of the treatment fluids of this disclosure, it is not envisioned that hazards are posed.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that they introduce. If there is any conflict in the usages of a word or term in this specification and one or more patent or other documents that may be incorporated herein by reference, the definitions that are consistent with this specification should be adopted.

The invention claimed is:
1. A method comprising:
providing or preparing a foamed chelating agent treatment fluid that comprises:
an aminopolycarboxylic acid chelating agent,
an aqueous base fluid,
a gas,
a foaming agent, and
a pyridinecarboxylic acid, and
placing the foamed chelating agent treatment fluid in a subterranean formation penetrated by a well bore.

2. The method of claim 1 wherein the aminopolycarboxylic acid chelating agent comprises one selected from the group consisting of: methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, and any combination thereof.

3. The method of claim 1 wherein the treatment fluid comprises methylglycine diacetic acid (MGDA) and further comprises glutamic acid diacetic acid (GLDA).

4. The method of claim 1 wherein the treatment fluid further comprises a chelating agent selected from the group consisting of: ethylenediaminetetraacetic acid (EDTA), ethylenediamindi(o-hydroxyphenylacetic) acid (EDDHA), glucoheptonic acid, gluconic acid, citric acid, any salt thereof, any derivative thereof, or any combination thereof.

5. The method of claim 1 wherein the concentration of the aminopolycarboxylic acid in the treatment fluid is in the range of about 0.1% to about 40% of the treatment fluid by weight.

6. The method of claim 1 wherein the aqueous base fluid comprises one selected from the group consisting of: fresh water, acidified water, salt water, seawater, brine, a saturated salt solution, a non-saturated salt solution, a mutual solvent, a glycol, a glycol ether, and any combination thereof.

7. The method claim 1 wherein the base fluid is present in an amount ranging from about 0% to about 95% by weight of the treatment fluid.

8. The method claim 1 wherein the gas comprises a gas selected from the group consisting of: air, nitrogen, carbon dioxide, an inert gas, argon, helium, and any combination thereof.

9. The method of claim 1 wherein the gas is present in an amount ranging from about 1% to about 80% by volume of the chelating agent.

10. The method of claim 1 wherein the treatment fluid further comprises a foaming agent selected from the group consisting of: an alkoxylated alcohol, an alkoxylated sulfated alcohol, an alkyl sulfonate, an aryl sulfonate, a quaternary amine derivative, an alkyl amine reacted with sodium chloroacetate, an alkali metal salt of a fatty acid, and any combination thereof.

11. The method of claim 1 wherein the subterranean formation has a bottom hole temperature of about 250° F. or more.

12. A method comprising:
preparing or providing a foamed chelating agent treatment fluid that comprises:
an aminopolycarboxylic acid chelating agent,
an aqueous base fluid,
a gas,
a foaming agent, and
a pyridinecarboxylic acid;
providing an equipment having a scale residue including metal ions; and
circulating the foamed chelating agent treatment fluid through the equipment so that the chelating agent interacts with the metal ions to reduce the quantity of scale residue in the equipment.

13. The method of claim 12 wherein the circulating step is selected from the group consisting of an open circulation and a closed circulation.

14. The method of claim 12 wherein the equipment is selected from the group consisting of a section of a pipeline, a heat exchanger, and a turbine.

15. The method of claim 12 wherein the aminopolycarboxylic acid chelating agent comprises one selected from the group consisting of: methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, and any combination thereof.

16. The method of claim 12 wherein the treatment fluid comprises methylglycine diacetic acid (MGDA) and further comprises glutamic acid diacetic acid (GLDA).

17. A foamed chelating agent treatment fluid comprising:
an aminopolycarboxylic acid chelating agent,
an aqueous base fluid,
a gas,
a foaming agent, and
a pyridinecarboxylic acid.

18. A system comprising:
a mixing tank containing a foamed chelating agent treatment fluid of claim 17;
a tubular configured so as to deliver the foamed chelating agent treatment fluid to
a subterranean formation or an equipment from the mixing tank.

19. The system of claim 18 further comprising at least one additional component selected from the group consisting of: a wellhead, a feed line, a transportation truck, a supply hopper, a valve, a condenser, an adapter, a joint, a gauge, a sensor, a compressor, a pressure controller, a pressure sensor, a flow rate controller, a flow rate sensor, a temperature sensor, and any combination thereof.

* * * * *